3,351,575
RESINOUS COATING MATERIAL
Allan E. Gilchrist, Fairview Park, Ohio, assignor, by mesne assignments, to Ford Motor Company, Dearborn, Mich., a corporation of Delaware
No Drawing. Filed Apr. 10, 1962, Ser. No. 186,320
The portion of the term of the patent subsequent to Jan. 18, 1983, has been disclaimed
1 Claim. (Cl. 260—19)

This application is a continuation-in-part of my copending application Ser. No. 132,303, filed on Aug. 18, 1961, now abandoned, the disclosure of which is incorporated herein by reference.

This invention relates to an improvement for extending carboxylic acid resins with phenol-aldehyde resins, and more particularly to such extended resin for use in a process wherein substantial energy is to be applied to the resin before their cure as, for example, in an electrical coating process.

Advantages of this invention over prior practice include prolonged stability of the mixed resin composition and paints, enamels, and lacquers containing same in a use such as for electrical coating deposition. This promotes uniformity and homogeneity of the deposited mixed resin and gives longer practical operating times. The phenol-aldehyde resins are added with the acid resins to extend to acid resins and to impart salt spray resistance and, in some cases, hardness.

Broadly, my improvement for extending a carboxylic acid resin with a phenol-aldehyde condensation product comprises blending said acid resin with non-heat reactive phenol-aldehyde resin at a temperature between about 400° and about 500° F. for at least about 30 minutes.

The heating together, preferably with agitation such as stirring, of the acid resin and the phenolic resin for at least about a half hour, and preferably about one to about two hours or more, appears to give a chemical bonding between these components and no free phenolic resin appears to remain. Thus, when the resin is used in a coating operation such as an electrical coating operation, the coating is essentially homogeneous and in a bath containing the resulting resin product there is no appreciable build-up of free phenolic bodies dissociated from the resin in an appreciable operating time.

The phenolic resins useful in my process are "non-heat reactive" in the ordinary sense used in that art, in other words, they will not polymerize substantially when aged at 150–180° F. Typically, the mole ratio of phenol or hydrocarbyl-substituted phenol to formaldehyde in making them up is between about 0.6 and about 1.2. The condensation can be made in conventional manner such as acid condensation. The "phenol" used can be mono-hydroxybenzene, a substituted phenol such as one with alkyl or phenyl substitution, cresol, related polyhydroxy aromatic such as resorcinol, catechol and their hydrocarbyl-substituted derivatives, and mixtures of the foregoing. For efficiency and economy the preferred phenols are $C_{4-8}$ alkyl phenols, typically amyl phenol and para tertiary butyl phenol. To obtain a resin of highest quality, the condensation product can be steam-stripped to rid the resin of free phenol and/or low molecular weight substances.

The proportion of phenolic resin for blending with the acid resin preferably is about 15–35% to impart special salt spray resistance to the resulting cured resin after its electrodeposition as, for example, on a steel panel. The use of substantially less than 5% phenolic resin in the reaction mixture can be helpful, but is not as practical for achieving this end. The use of substantially more than about 50% of phenolic resin in the resin mixture gives a resulting resinous product which is often difficult to disperse in water or render water soluble therein by amine neutralization. Hence, it should be avoided unless there are sufficient free hydroxyl groups on the resulting blended resin contributed by the phenolic resin component to give good water solubility characteristics.

It is essential to use a phenolic resin that is non-heat reactive in my process so that the resulting blended material will not tend to polymerize in normal storage, handling, or use, and thereby change uncontrollably in characteristics.

In the blending operation with the acid resin use of a temperature as high as about 350° F. does not appear to unite the resin in a practical time to prevent phenolic resin separation, as will be shown in the example which follow. On the other hand, the use of blending temperatures substantially above about 500° F. causes substantial bodying of the resin blend and can even lead to gelation. Such resins will not disperse well in water when neutralized with an amino compound. The low limit of blending time of one-half hour is a practical one to insure adequate union of the resins. A one-hour blending time is preferred but even longer times can be used, e.g., 2–4 hours or more, provided that some increase in viscosity can be tolerated in the resulting blended resins.

In the practice of my invention the preferred acid resins are broadly those also shown to be preferred in my copending parent patent application, that is, consisting essentially of a coupled siccative oil reacted with about 2–25% of a polymerizable vinyl monomer, this reaction product having electrical equivalent weight between about 1,000 and about 20,000. One criterion is that the Acid Number, determined by titration with caustic solution of the acid resin be at least about 30 and preferably between about 80 and 300.

Suitable neutralizing amino compounds for the electrocoating work are water-soluble hydroxy amines and polyamines such as are shown in more detail in my copending parent patent application S.N. 132,303. For efficiency and economy I prefer a hydroxy amine such as diisopropanol amine. Some ammonia can be used, If desired, in conjunction with the amine as shown in my copending parent application. Advantageously, neutralization with the amine is partial to complete.

I have found that blending the acid resin with the phenol-aldehyde resin at about 250–380° F. gives a product which in prolonged electrocoating bath operation tends to split off phenolic resin or fragments thereof. These increase in concentration in the bath as the coating operation goes on and require eventual premature shut-down of bath operations. This failure in stability appears in deposited resins as unevenness of deposited films and also affects the homogeneity of such films and the "throw" (evenness of deposition on all exposed surfaces of an electrode) in the bath.

The following example shows a way in which my invention has been practiced, but should not be construed as limiting the invention. Unless otherwise specified, all percentages herein are weight percentages and all parts are weight parts.

EXAMPLE

Vehicle A was made by reacting in an agitator tank 6,197 parts of linseed oil and 1,484 parts of maleic anhydride (heated together to 450° F. for 3 hours until an Acid Value of 80–90 resulted), then cooling this intermediate to 315° F., adding 1,309 parts of vinyl toluene containing 35 parts of ditertiary butyl peroxide and reacting at 425° F. for about an hour. The resulting vinyl toluenated material was then cooled to 315° F. and 3,875 parts of non-heat reactive, thermoplastic, oil soluble phenolic resin was added, the temperature raised to 350° F., and the mixture held one hour. The phenolic resin was the acid-condensed product of equimolar quantities of amyl phenol and formaldehyde, having Acid Number of 10±2 and specific gravity at 25° C. of 1.14. The material was then cooled to 200° F., reduced with 3000 parts of water, neutralized with 2060 parts of diisopropanol amine at 170–190° F., agitated for ½ hour, then further reduced with 17,179 parts of water.

Vehicle B was made in the same manner except that the phenolic resin was mixed with the siccative oil-modified polycarboxylic acid resin at 450° F. for one hour.

Comparative black paints were made by mixing together 88 parts of carbon black and sufficient of the particular aqueous resin vehicle to supply 1254 parts of resin solids. Samples of each of the resulting black paints were reduced to 5% total solids concentration by the addition of water to form an electrocoating bath, the resin vehicle of the paint being soluble in the water and the pigment being suspended.

In the test operations on each paint the anodes used were phosphate-treated steel shim stock dipped to expose a square foot of surface to contact with the bath, and the cathode was a 2500 ml. capacity metal tank containing the particular bath of dilute paint. Direct current was imposed on the tank cathode and an immersed panel anode from an external circuit using constant current of 2–2.5 amperes per square foot, and the voltage during the paint deposition process on a particular anode was raised by decreasing electrical resistance in the portion of the electrical circuit external to the bath. The voltage was run up to 150 volts, at which time the resulting coated anode was removed from the bath, the excess adhering liquid blown off with air, and the coated anode baked for 10–15 minutes at 380° F. Before baking, the electrically deposited paint film was slightly tacky and tenaciously adhering. After baking, the film was cured. When one anode was coated and withdrawn from the bath another was inserted and the bath was replenished periodically, as the solids dropped about 2%, with sufficient additional paint of the same kind to maintain paint solids content in the bath at about 5%.

After about 45 of the panels had been coated successively in each bath, each bath was dialyzed in the same manner in an external dialyzer using a regenerated cellulose membrane having 48 A. pore size. The used bath was passed into the chamber on one side of the membrane and fresh water on the other at double the flow rate of the used bath.

Analysis of the material dialyzing from the used bath made with the Vehicle B paint showed no phenolic substance, showing the good stability of this resin blend. Analysis of the material dialyzed from the used bath made with the Vehicle A paint indicated that roughly 10% of the phenolic resin did not migrate with the acidic resin to plate out on the anodes, but rather dissociated and possibly fragmented in some fashion and migrated through the dialysis membrane as low molecular weight phenolic material.

Coated panels from these tests were subjected to a conventional salt spray test (fog of 3% sodium chloride solution sprayed on the panels in a cabinet maintained at 90° F.). The panels coated with paint made from Vehicle B showed the greater corrosion resistance as the tests extended beyond 168 hours' exposure.

I claim:

A phenolic resin-extended polycarboxylic acid resin consisting essentially of the product of heating together at a temperature between about 400° and 500° F. for at least about 30 minutes:

(a) 50–95 weight parts of a coupled siccative oil reacted under substantially anhydrous conditions with about 2–25%, based on the weight of said coupled siccative oil, of a vinyl monomer, wherein the resulting reaction product (a) has an Acid Number of at least about 30, and (b) 5–50 weight parts of an oil soluble, non-heat reactive phenol-aldehyde resin.

References Cited

UNITED STATES PATENTS

| | | | |
|---|---|---|---|
| 1,867,583 | 7/1932 | Moore et al. | 260—20 |
| 1,870,455 | 8/1932 | Hönel | 260—20 |
| 2,151,006 | 3/1939 | Beisler | 260—20 |
| 2,188,890 | 1/1940 | Clocker | 260—19 |
| 2,206,090 | 7/1940 | Haggenmacher | 204—181 |
| 2,207,847 | 7/1940 | Auer | 260—20 |
| 2,310,935 | 2/1943 | Carlton et al. | 260—20 |
| 2,586,385 | 2/1952 | Runk | 260—20 |
| 2,731,428 | 1/1956 | Harrison | 260—19 |
| 2,941,968 | 7/1960 | McKenna | 260—22 |
| 3,230,162 | 1/1966 | Gilchrist | 204—181 |

FOREIGN PATENTS 1,071,945  12/1959  Germany.

OTHER REFERENCES

Runk II, Industrial & Engineering Chemistry, vol. 42, No. 10, October (1950) (pages 2110–2114) (Copy in Scientific Library).

DONALD E. CZAJA, *Primary Examiner.*

LEON J. BERCOVITZ, *Examiner.*

R. W. GRIFFIN, R. McKELVEY, *Assistant Examiners.*